No. 762,635. Patented June 14, 1904.

UNITED STATES PATENT OFFICE.

LINDSAY R. HURST AND GEORGE H. BEECHUM, OF LOUISVILLE, KENTUCKY.

INCRUSTATION PREVENTIVE.

SPECIFICATION forming part of Letters Patent No. 762,635, dated June 14, 1904.

Application filed November 20, 1903. Serial No. 182,033. (No specimens.)

*To all whom it may concern:*

Be it known that we, LINDSAY R. HURST and GEORGE H. BEECHUM, of Louisville, in the county of Jefferson and State of Kentucky, have invented a new and useful composition of matter to be used for the removal and prevention of scale and incrustation in boilers, condensers, gasolene-engines, and all heated steam vessels, of which the following is a specification.

Our composition consists of the following ingredients combined in the proportions stated, viz: chestnut-oak-bark extract, fifty gallons; black-oak-bark extract, fifty gallons; red-oak-bark extract, fifty gallons; water, substantially pure, four hundred and fifty gallons; burnt sugar, fifty gallons; alcohol, twenty-five gallons. These ingredients are to be thoroughly mingled by agitation.

In using the above-named composition the application is made through the water-supply of the boiler. The quantity must be one quart of solution for every seventy-five-horse-power boiler three times a week, all other boilers or steam-generators in proportion.

What we claim, and desire to secure by Letters Patent of the United States, is—

1. The herein-described composition of matter consisting of water, black-oak extract, red-oak extract, chestnut-oak extract, burnt sugar and alcohol, substantially as described and for the purpose specified.

2. The herein-described composition of matter for removing and preventing the incrustation and scale from forming on the inside of steam-boilers, heaters, condensers, gasolene-engines and all heated vessels, consisting of pure water, four hundred and fifty gallons; chestnut-oak-bark extract, fifty gallons; black-oak-bark extract, fifty gallons; red-oak-bark extract, fifty gallons; burnt sugar, fifty gallons; alcohol, twenty-five gallons, substantially as described.

In testimony whereof we have signed our names to this specification in the presence of two subscribing witnesses.

LINDSAY R. HURST.
GEORGE H. BEECHUM.

Witnesses:
WILLIAM D. HILLSON,
C. M. KERLIN.